(No Model.)

J. GIBBONS.
SNAP HOOK.

No. 276,965. Patented May 1, 1883.

Witnesses.
C. J. Mattison.
G. B. Beaver.

Inventor.
JOHN GIBBONS
by William H. Low,
Attorney.

UNITED STATES PATENT OFFICE.

JOHN GIBBONS, OF WEST TROY, NEW YORK, ASSIGNOR TO THE UNION HARDWARE MANUFACTURING COMPANY, OF SAME PLACE.

SNAP-HOOK.

SPECIFICATION forming part of Letters Patent No. 276,965, dated May 1, 1883.

Application filed December 6, 1882. (No model.)

*To all whom it may concern:*

Be it known that I, JOHN GIBBONS, of West Troy, in the county of Albany and State of New York, have invented certain new and useful Improvements in Snap-Hooks, of which the following is a full and exact description, reference being had to the accompanying drawings, which form part of this specification, and in which—

Figure 1:
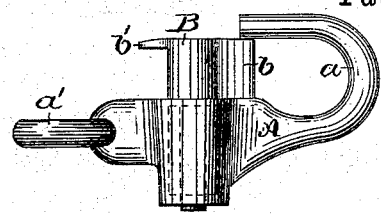
Figure 2:
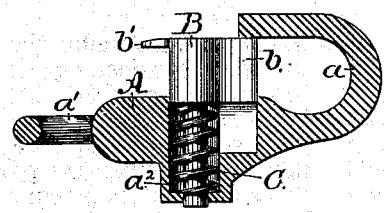
Figure 3:
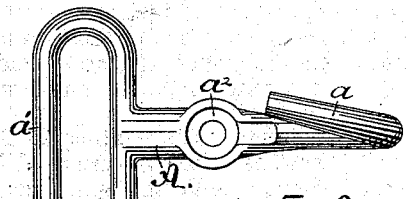
Figure 4:
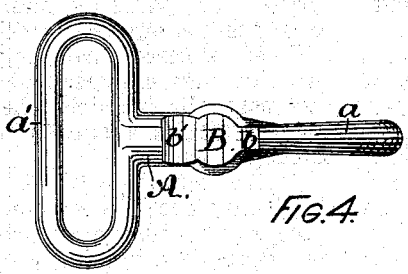

Figure 1 is a side elevation of my invention; Fig. 2, a longitudinal section of the same; Fig. 3, a plan view of the hooked body-piece of the device, and Fig. 4 a plan view of the snap-hook in a completed state.

My invention relates to improvements in snap-hooks provided with sliding bolts; and it consists in constructing such hooks with a spring-actuated sliding bolt, whose line of movement crosses the longitudinal center line of the hooked body-piece in such manner that the head of the sliding bolt will engage underneath the hook on said body-piece, as hereinafter set forth.

As illustrated in the drawings, A represents the body-piece of my device; B, the sliding bolt, and C the spring for actuating the said bolt.

The body-piece A is cast of malleable metal, and is provided at one end with a hook, $a$, which, for the purpose of facilitating the operation of molding it for casting and for the insertion of the other parts of the device, should, when first produced, have a sidewise twist in it, as shown in Fig. 3. At its opposite end the body-piece has an eye, $a'$, or other suitable appliance for securing the device to a rope, strap, or other article. The said body-piece is also provided with a recess or chamber, $a^2$, whose axis crosses, either in a perpendicular or angular direction, the longitudinal center line of the body-piece.

The sliding bolt B is fitted to slide freely in the recess $a^2$ of the body-piece, and, as shown in the drawings, it is provided with a wing, $b$, which engages under the end of the hook $a$ and closes the opening at that point. The said wing prevents the sliding bolt from turning in the chamber $a^2$, and thus maintains the rearwardly-projecting lip $b'$ in an accessible position for receiving the pressure from a finger or thumb when it is required to force the said bolt downward in the chamber $a^2$.

The spring C is contained in the chamber $a^2$, and is arranged to exert its pressure against the lower end of the sliding bolt B in such manner that the head of said bolt will be held in contact with the under side of the end of the hook $a$.

To open this snap-hook the sliding bolt B must be pressed downward into the chamber $a^2$ until sufficient space is obtained between the head of said bolt and the end of the hook $a$ for the introduction of any required article thereinto. Then, upon the releasement of the downward pressure, the resilient force of the spring C will cause the sliding bolt to return to its position of contact with the hook $a$.

When preferred the wing $b$ and lip $b'$, or either of them, may be dispensed with; but in such cases the cylindrical head of the sliding bolt B should be adapted to engage under the end of the hook $a$.

I claim as my invention—

In a snap-hook, the combination, with a body-piece, A, provided with a hook, $a$, and a chamber, $a^2$, the latter being ranged crosswise of the longitudinal center line of said body-piece, as herein described, of the sliding bolt B and spring C, contained in the chamber $a^2$, the said sliding bolt being arranged to move crosswise of the center line of the body-piece A, and to engage against the under side of the end of hook $a$, as and for the purpose specified.

JOHN GIBBONS.

Witnesses:
WILLIAM H. LOW,
J. T. WILLSON.